J. M. NOLL.
APPARATUS FOR PURIFYING WATER.
APPLICATION FILED SEPT. 22, 1910.

1,148,920.

Patented Aug. 3, 1915.
4 SHEETS—SHEET 4.

Witnesses
Daniel Webster, Jr.
A. M. Kelly

Inventor
Jacob M. Noll
By
Attorney

UNITED STATES PATENT OFFICE.

JACOB M. NOLL, OF COLLINGSWOOD, NEW JERSEY, ASSIGNOR TO WARREN WEBSTER & COMPANY, A CORPORATION OF NEW JERSEY.

APPARATUS FOR PURIFYING WATER.

1,148,920.  Specification of Letters Patent.  Patented Aug. 3, 1915.

Application filed September 22, 1910. Serial No. 583,153.

*To all whom it may concern:*

Be it known that I, JACOB M. NOLL, a citizen of the United States, and resident of Collingswood, Camden county, State of New Jersey, have invented an Improvement in Apparatus for Purifying Water, of which the following is a specification.

My invention relates particularly to what is known as the "hot process" of water purification in which a chemical in solution is introduced into a water heating chamber for the purpose of precipitating, and thus removing, mineral impurities in the water.

While the principal application of the invention is to feed water heaters for the purpose of purifying water for boiler feed, the invention is also applicable to any system of water purification by the hot process, as in dye-houses, laundries and chemical works.

In carrying out my invention I mount the chemical-tank, in which the solution is made, above the heater-chamber, so as to be subjected to the heat thereof, and discharge the solution directly from that tank into the heater chamber.

In the preferred arrangement, the chemical tank is in a shell or casing, which extends above the casing of the heater-chamber, and forms a steam jacket, in communication with the interior of the heater-chamber. The chemical tank is thus kept hot at all times, and this not only facilitates the making of the solution, but also prevents recrystallization, not only in the tank itself, but also during the passage of the solution through the feed-pipe and valve. An equalizing-pipe between the steam jacket and chemical tank equalizes the pressures in the heater-chamber and chemical tank, and overcomes the difficulties due to differences in pressure before referred to. The maintenance of this equalization of the pressures is made possible by the steam jacketing effect as obtained by the construction described, since the temperature in the chemical tank is kept at approximately the temperature of the heater-chamber, and prevents a change in density of the chemical solution which would be occasioned, should condensation of the steam passing through the equalization pipe take place in the chemical tank. This combination of the chemical tank with the heater-chamber not only obviates the functional difficulties referred to, but it provides an apparatus that is much simpler, less expensive and easier to erect.

Figure 1:
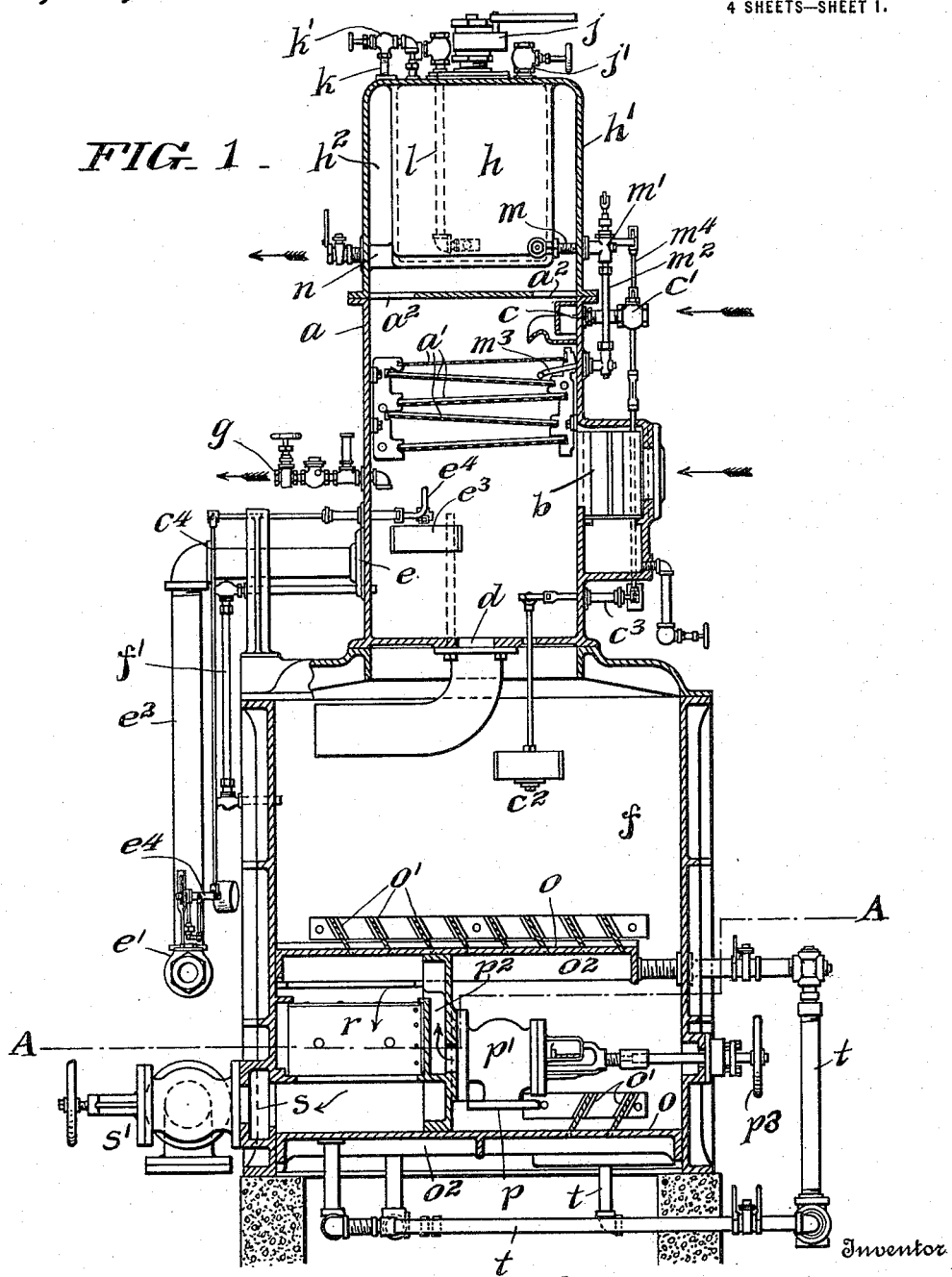
Figure 2:
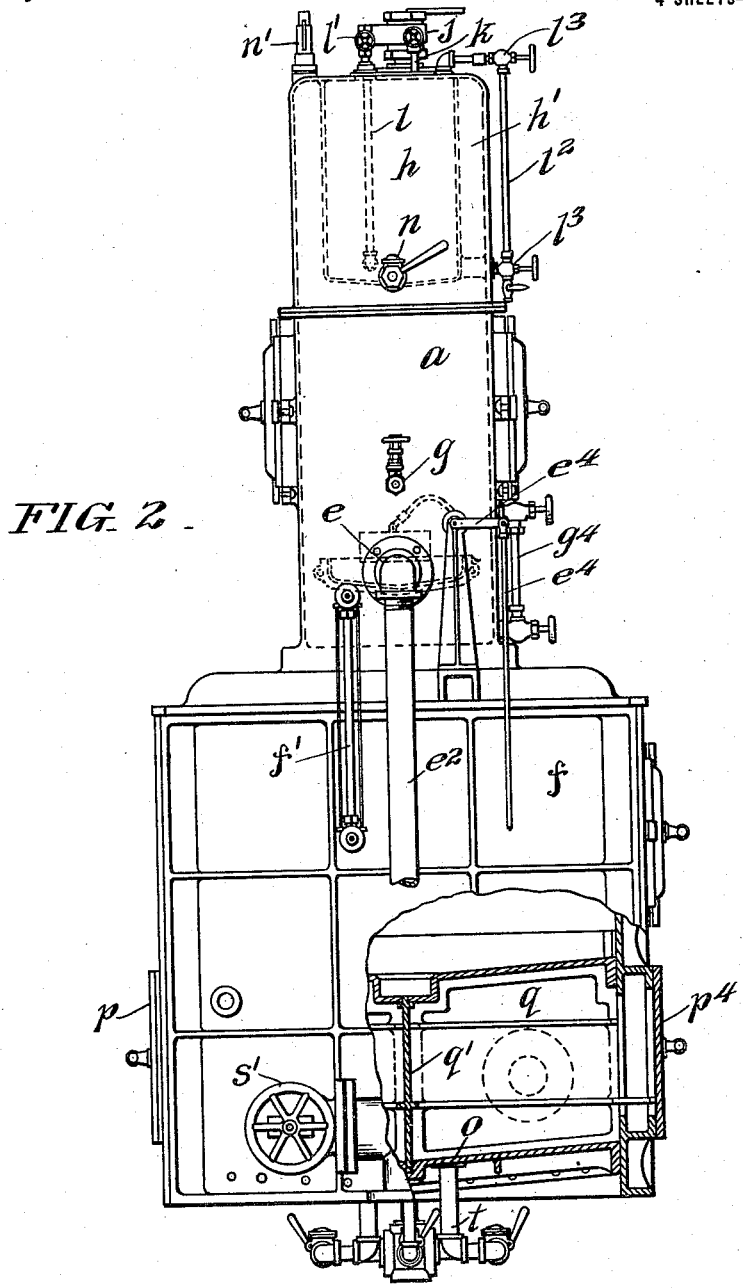
Figure 3:
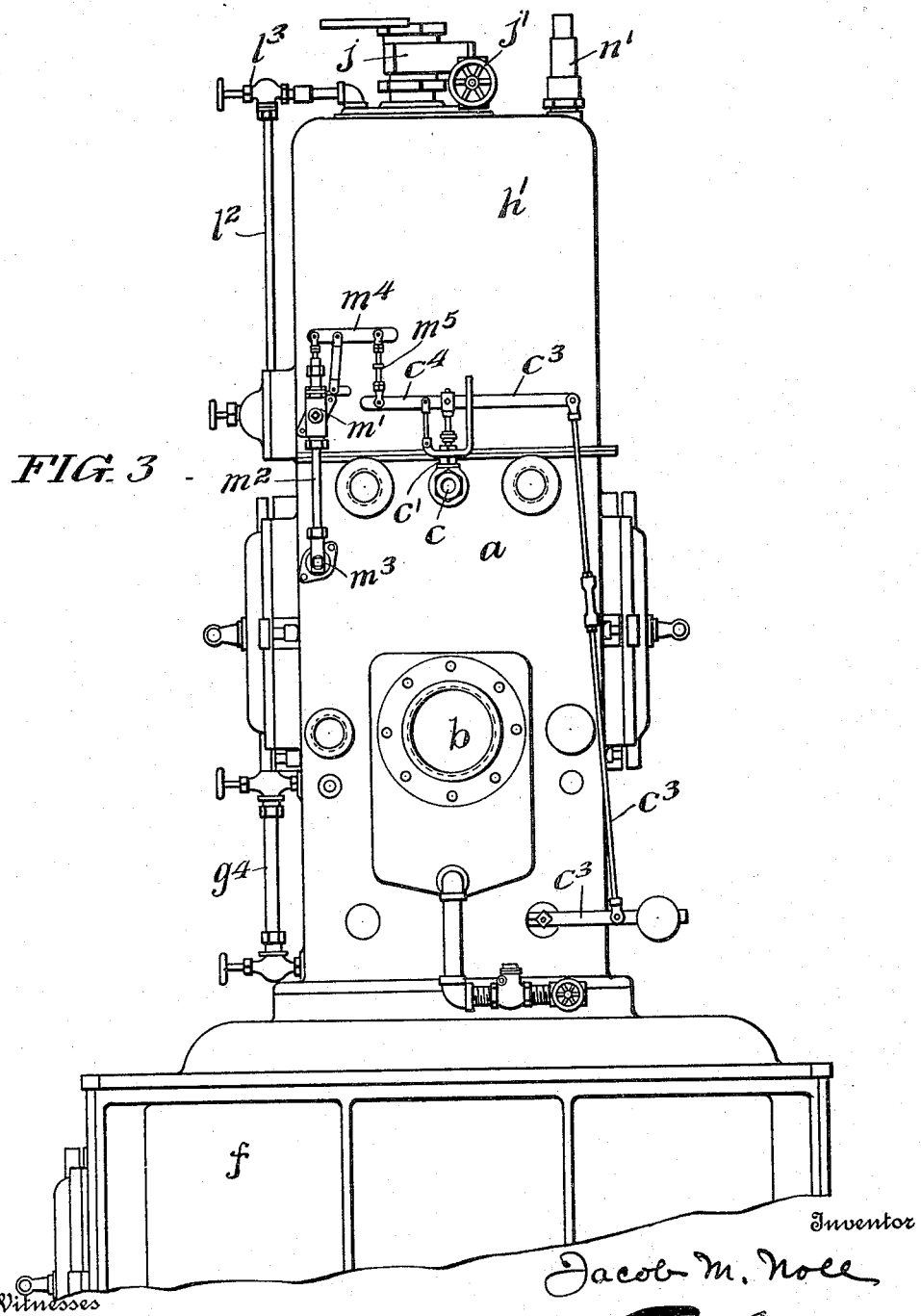
Figure 4:
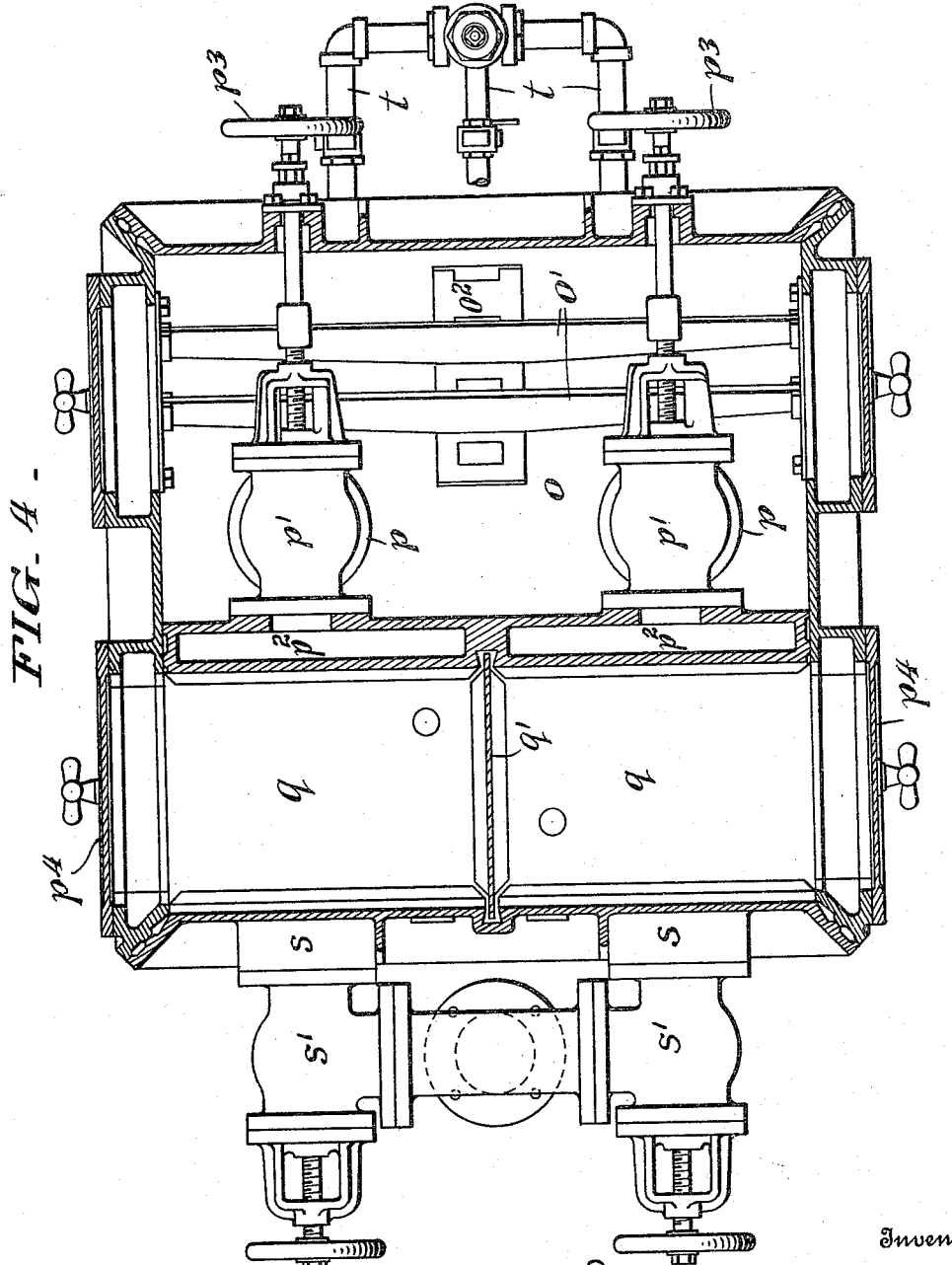

In the drawings: Figure 1 is a vertical sectional elevation of the apparatus; Fig. 2 is an elevation of the discharge side of the apparatus with a part of the casing of the filtering and purifying chamber broken away and the adjacent portion of the filter in vertical section; Fig. 3 is an elevation of the upper portion of the supply-side of the apparatus on an enlarged scale; and Fig. 4 is a horizontal section on the broken line A—A of Fig. 1 on an enlarged scale.

$a$ is the heater-chamber. As shown, it is of the "open" type provided with a series of water-trays $a'$, a steam inlet $b$, a water inlet $c$, a discharge outlet $d$, and an overflow-outlet $e$. The discharge outlet $d$ opens into the filter-chamber $f$, upon which the casing of the heater-chamber is erected, and the water-inlet is controlled by a valve $c'$ which is in turn controlled by a float $c^2$ in the filter-chamber through suitable lever-connections $c^3$. The overflow is also controlled by a valve $e'$, in the overflow-pipe $e^2$, which is in turn controlled by the float $e^3$ in the heater chamber $a$, through suitable lever-connections $e^4$.

$g$ is a vent and vacuum-breaker device to permit air to escape from the heater and prevent formation of high vacuum which would interfere with the operation of the boiler-feed pump.

$g^4$ is a gage-glass to show the level of the water in the heater-chamber.

$h$ is the chemical-chamber which is placed above the heater-chamber $a$. This is contained in a shell or casing $h'$, secured to the top of the heater-chamber, or if desired made continuous therewith. The shell forms a steam-space or jacket $h^2$, about the chemical-chamber, into which steam from the heater-chamber may pass through suitable openings $a^2$.

$j$ is a valved opening in the top of the chemical-chamber $h$ through which the chemicals may be introduced. As shown, the opening $j$ is of substantial size and controlled by a gate-valve. The chemicals are introduced in crystalline form, usually by means of a funnel.

$j'$ is a valved inlet through which water may be supplied.

$k$ is a pressure-equalizing-pipe between the steam jacket $h^2$ and the chemical-chamber $h$ and is provided with a suitable valve $k'$.

$l$ is a steam-pipe, controlled by a valve $l'$, extending into the chamber $h$ and provided at its lower end with a steam jet by which steam is injected to agitate the contents of the chamber and thoroughly mix the water and chemicals together.

$l^2$ is a gage-glass, between the top and bottom of the chamber $h$ and having the usual valves $l^3$.

$m$ is the outlet for the chemical solution from the bottom of the chamber $h$. The solution flows by gravity through the valve $m'$ and sight-tube $m^2$ to the inlet $m^3$ in the heater-chamber. As shown this inlet is placed below the water inlet $c$ and immediately above the second tray, but the particular location of the inlet for the solution is not material. The valve $m^2$ is connected with the water-valve $c'$, so as to operate with it, by suitable connections, such as the levers $m^4$, $c^4$ and link $m^5$.

$n$ is a valved outlet from the chamber $h$ by which test samples may be taken, and the contents may be drained off when desired.

$n'$ is a safety-valve from the steam-jacket $h^2$.

$f'$ is a gage-glass between the lower part of the heater-chamber $a$ and the upper part of the chamber $f$. In the filtering and purifying chamber $f$ are suitable precipitating pans $o$, $o$ provided with baffle-plates $o'$ over which the water passes to the inlets $p$, $p$ to the filtering devices. In the preferred construction, as shown, the filtering-chamber is divided into two compartments $q$ $q$ by a partition $q'$, each compartment containing a removable filter $r$, and the water after passing the valves $p'$ $p'$ goes up through passages $p^2$ $p^2$ above the filters, and after passing down through them is discharged through the outlets $s$ $s$ to the feed-pump. The filters $r$ $r$ are preferably constructed of perforated boxes containing sand. The valves $p'$ $p'$ may be controlled independently of one another from the outside by the hand wheels $p^3$. The outlets $s$ $s$ may also be independently controlled by the valves $s'$. Thus either filter compartment may be closed to the passage of water and the filter thereof removed and replaced through door $p^4$ without closing off the other compartment or interrupting the feeding of the pump.

$t$ $t$ are drain pipes for the precipitated matter leading from the precipitating pans. The faces of these pans are preferably inclined toward a central trough $o^2$ from which the drain pipes $t$ lead.

The operation is as follows: The heater is operated in the usual manner by admitting steam and water by the inlets $b$ and $c$, and the chemical solution is supplied to the water from the tank $h$ through the valve $m'$ and inlet $m^3$. When the chemical-tank requires refilling—which is known by the definite time in which the tank usually discharges and is also indicated by the gage-glass $l^2$—the valve $k'$ in the equalizing-pipe $k$ is closed, and the valve $j$ is opened. A measured quantity of the chemical in crystalline form is then introduced by a funnel through the gate-valve $j$, and a sufficient quantity of water is added to make the desired solution. Steam is blown in through the pipe $l$ and stirs up and heats the chemical causing it to dissolve. Excess pressure may be avoided by leaving the valve $j'$ open. The steam from the heating-chamber passes up into the jacket $h^2$ about the chemical chamber $h$ and keeps it and the solution highly heated.

When the chemical is dissolved and the solution is of proper strength, the valve $j'$ is closed and the valve $k'$ in the equalizing pipe $k$ is opened. An equilibrium of pressures in the chemical tank and heater-chamber is thus established and is readily maintained, and since the chemical-tank is surrounded by steam from the heating-chamber, and is therefore at practically the same temperature, little or no condensation from the heater-chamber will take place in the chemical-tank, and there will be no material weakening of the solution. As the valve $c'$ opens under the control of the float $c^2$ to admit water to the heater the valve $m'$ will be similarly opened and a quantity of the hot chemical solution will be admitted through the tube $m^2$ and inlet $m^3$. This admission of the chemicals and water takes place at corresponding times so that the chemicals are being admitted only when the water is flowing. As the solution is thus maintained in a highly heated condition when it is admitted to the heater-chamber the tendency to recrystallization will be reduced to a minimum, and the valve $m'$ and feed passageway will be kept clean and efficient.

The heated water containing the solution passes through the outlet $d$ into the chamber $f$ and thence through the inlets $p$, valves $p'$ and passageways $p^2$ into the compartments $q$ $q$ above the filters $r$, and finally flows down through the filters to the outlets $s$ and thence to the feed-water pump. The water passes through the filters with a down-flow and this with sand filters results in a very thorough filtration. The sand filters may be easily cleaned by reversing the flow, and either filter may be removed and replaced without interrupting the flow through the other. The precipitate is caught by the baffles o' on the trays o and is discharged through the drains t.

The heater-body and chemical-tank, whether in one continuous shell or in separate parts as shown, may be used with purifying and filtering chambers of different sizes according to the quantity of water to be treated. With relatively large purifiers and filtering chambers the water continues for a longer time therein and increases precipitation and better purification may be had.

What I claim is as follows:

1. The combination with the heater-chamber of a feed-water heater, of means for supplying the water to be heated directly into said chamber, means to supply steam to said chamber, an upper chamber located immediately above said heater-chamber and in direct communication with the interior thereof, a tank to contain chemical solution located within said upper chamber and heated by the steam passing into said chamber from the heater-chamber, and a discharge pipe for the heated solution leading from the chemical chamber to the heater-chamber.

2. The combination with the heater-chamber of a feed-water heater, of means for supplying the water to be heated directly to said chamber, means to supply steam to said chamber, an upper chamber located immediately above said heater-chamber and in direct communication with the interior thereof, a tank to contain chemical solution located within said upper chamber and of smaller size so as to form a steam jacket between the tank and chamber in direct communication with the heater chamber, and a discharge pipe for the heated solution leading from the tank.

3. The combination with the heater-chamber of a feed-water-heater, of means for supplying water to be heated directly to said chamber, means to supply steam to said chamber arranged below the means for supplying water thereto, a compartment to contain chemical solution located at a higher elevation than the means for supplying water to the chamber and arranged to be heated by the steam passing into the heater chamber, a discharge pipe for the heated solution leading downward from the compartment to the heater-chamber, and means providing a pressure equalizing passage between the heater-chamber and the compartment containing the chemical solution.

4. The combination with the heater-chamber of a feed-water heater, of means for supplying the water to be heated directly into said chamber, means to supply steam to said chamber, an upper chamber located immediately above said heater-chamber and in direct communication with the interior thereof, a tank to contain chemical solution located within said upper chamber and heated by the steam passing into said chamber from the heater-chamber, said upper chamber forming a steam jacket about said tank, a discharge pipe for the heated solution leading from the chemical chamber to the heater-chamber, a pressure-equalizing pipe between the steam jacket and tank, and a steam pipe leading into said tank to inject steam into the contents thereof.

5. The combination with a heater-chamber of a feed-water-heater into which steam is supplied, of means for spraying water into the chamber, a closed tank wholly above the means for spraying the water into the chamber having its interior separated from the heater-chamber to contain chemical solution separate from the feed-water and said tank having its walls subjected wholly to the heat of the steam within the heater-chamber and out of contact with the water therein, and a discharge pipe leading from the tank to the heater-chamber and delivering the chemicals by gravity to the means for spraying the water into the heater-chamber.

6. In a hot process system of water purification, the combination of a water heating chamber having means to supply the water and the steam separately and directly into said chamber in contact with one another, a tank to contain chemical solution arranged in direct communication with the heating chamber so as to be directly subjected to the heat of the steam therein, but independent of the water supply to said heater, and a discharge pipe leading from the solution tank to said heating chamber to supply solution to the water therein.

7. In a hot process system of water purification, the combination of a water heating chamber having means to supply the water and the steam separately and directly into said chamber in contact with one another, a tank to contain chemical solution arranged in direct communication with the heating chamber so as to be directly subjected to the heat of the steam therein, but independent of the water supply to said heater, a discharge pipe leading from the solution tank to said heating chamber to supply solution to the water therein, a pressure equalizing pipe between the solution tank and the water heating chamber, a valve mechanism to control the admission of water directly into the heating-chamber and at regulated periods controlled by the level of the water therein, a valve mechanism to control the discharge of the solution from the solution tank into the heating-chamber at regulated periods timed with the admission of the water, and float actuated means for simultaneously operating said valve mechanisms whereby the admission of the chemical solution to the heating-chamber will always occur when the water is being admitted thereto.

In testimony of which invention, I hereunto set my hand.

JACOB M. NOLL.

Witnesses:
ROBERT RICHARD HUNTER,
J. LOGAN FITTS.

Copies of this patent may be obtained for five cents each, by addressing the "Commissioner of Patents, Washington, D. C."